US012343752B2

(12) United States Patent
Smith

(10) Patent No.: US 12,343,752 B2
(45) Date of Patent: Jul. 1, 2025

(54) SPRAYER APPARATUS FOR AN AEROSOL SPRAY CAN

(71) Applicant: Mathew Smith, Harristown (AU)

(72) Inventor: Mathew Smith, Harristown (AU)

(*) Notice: Subject to any disclaimer, the term of this patent is extended or adjusted under 35 U.S.C. 154(b) by 278 days.

(21) Appl. No.: 18/142,675

(22) Filed: May 3, 2023

(65) Prior Publication Data

US 2024/0367187 A1 Nov. 7, 2024

(51) Int. Cl.

*B05B 9/08* (2006.01)
*B65D 83/16* (2006.01)
*B65D 83/182* (2025.01)
*B65D 83/303* (2025.01)

(52) U.S. Cl.

CPC .......... *B05B 9/0805* (2013.01); *B65D 83/164* (2025.01); *B65D 83/182* (2025.01); *B65D 83/303* (2013.01)

(58) Field of Classification Search

CPC .. B05B 9/0805; B65D 83/164; B65D 83/182; B65D 83/303

See application file for complete search history.

(56) References Cited

U.S. PATENT DOCUMENTS 1,899,222 A * 3/1933 Werder ................ B65D 83/164 239/375
3,305,144 A * 2/1967 Beres ..................... B65D 83/28 251/95
3,428,224 A * 2/1969 Douglas ............... B65D 83/164 222/529
3,650,438 A * 3/1972 Stephenson .......... B65D 83/756 222/402.22
3,756,512 A * 9/1973 Dyal .................... B65D 83/756 239/394
4,350,299 A * 9/1982 Stephenson ............ B65D 83/24 239/588
4,496,081 A * 1/1985 Farrey .................... B65D 83/68 239/304
4,682,713 A * 7/1987 Clapp .................... B65D 83/14 239/574
4,895,280 A * 1/1990 Tourigny ............... B65D 83/60 285/82
5,344,051 A * 9/1994 Brown .................. B29B 7/7447 222/323
5,540,359 A * 7/1996 Gobbel ................ B65D 83/303 222/530
5,799,873 A * 9/1998 Lau ..................... B05B 11/1011 239/436
5,924,599 A * 7/1999 Brown .................. B05B 7/2467 222/402.15
7,713,365 B2 5/2010 Silvers
9,061,299 B1 6/2015 Fodor
2005/0150913 A1 7/2005 Ulrich
(Continued)

FOREIGN PATENT DOCUMENTS

CN 105745028 7/2016

*Primary Examiner* — Frederick C Nicolas

(57) ABSTRACT

A sprayer apparatus for dispensing fluid from an aerosol spray can includes a tube which is couplable to a valve stem of the aerosol spray can. A spray can valve actuator is coupled to the tube and couplable to the spray can. The spray can valve is operable to depress the valve stem to fluidly couple a chamber of the aerosol spray can and the tube. A dispenser gun is attached to the tube and is operable to release the fluid supplied through the tube.

20 Claims, 10 Drawing Sheets

(56) References Cited

U.S. PATENT DOCUMENTS

| | | | | |
|---|---|---|---|---|
| 2006/0254222 | A1 | 11/2006 | Hammarth | |
| 2009/0308946 | A1 | 12/2009 | Dube | |
| 2010/0323897 | A1 * | 12/2010 | Burke | A01N 25/30 206/524.1 |

* cited by examiner

SPRAYER APPARATUS FOR AN AEROSOL SPRAY CAN

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sprayer apparatuses and more particularly pertains to a new sprayer apparatus for dispensing fluid from an aerosol spray can.

(2) Description of Related Art Including Information Disclosed Under 37 CFR 1.97 and 1.98

The prior art describes several sprayer apparatuses which have a tube coupling a dispenser gun to a pressurized fluid container. However, the prior art does not disclose a sprayer apparatus which is configured to attach such a dispenser gun via a tube to a valve stem of an aerosol spray can and an actuator which depresses the valve stem to open the spray valve of the aerosol spray can. Such a device is advantageous in that it allows a user to attach the sprayer apparatus to conventional aerosol spray cans.

BRIEF SUMMARY OF THE INVENTION

An embodiment of the disclosure meets the needs presented above by generally comprising a tube with an inlet end and an outlet end. An inner dimension of the inlet end has a size such that the inlet end is configured to receive a valve stem of an aerosol spray can into the inlet and frictionally engage the valve stem to attach to the valve stem. A spray can valve actuator is coupled to the tube at the inlet end and comprises an attachment member and a collar. The attachment member is coupled to the tube, and the collar is coupled to the attachment member with the attachment member being positioned in the collar. An interior dimension of the collar has a size such that the collar is configured to frictionally engage a rim of the aerosol spray can to attach to the aerosol spray can. The attachment member is movable into a lowered position with respect to the collar and is configured to cause the tube to actuate the valve stem to open a spray valve of the aerosol spray can when the attachment member is moved into the lowered position such that a chamber within the aerosol spray can is in fluid communication with the tube.

A dispenser gun is coupled to the tube at the outlet end and comprises a housing, a dispenser valve, and a dispenser actuator. The housing is coupled to the tube, and the tube extends into the housing. The dispenser valve is positioned in the housing and is in fluid communication with the tube. The dispenser valve is movable between an open position and a closed position. The dispenser actuator is operatively coupled to the dispenser valve and extends away from the dispenser valve and out of the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
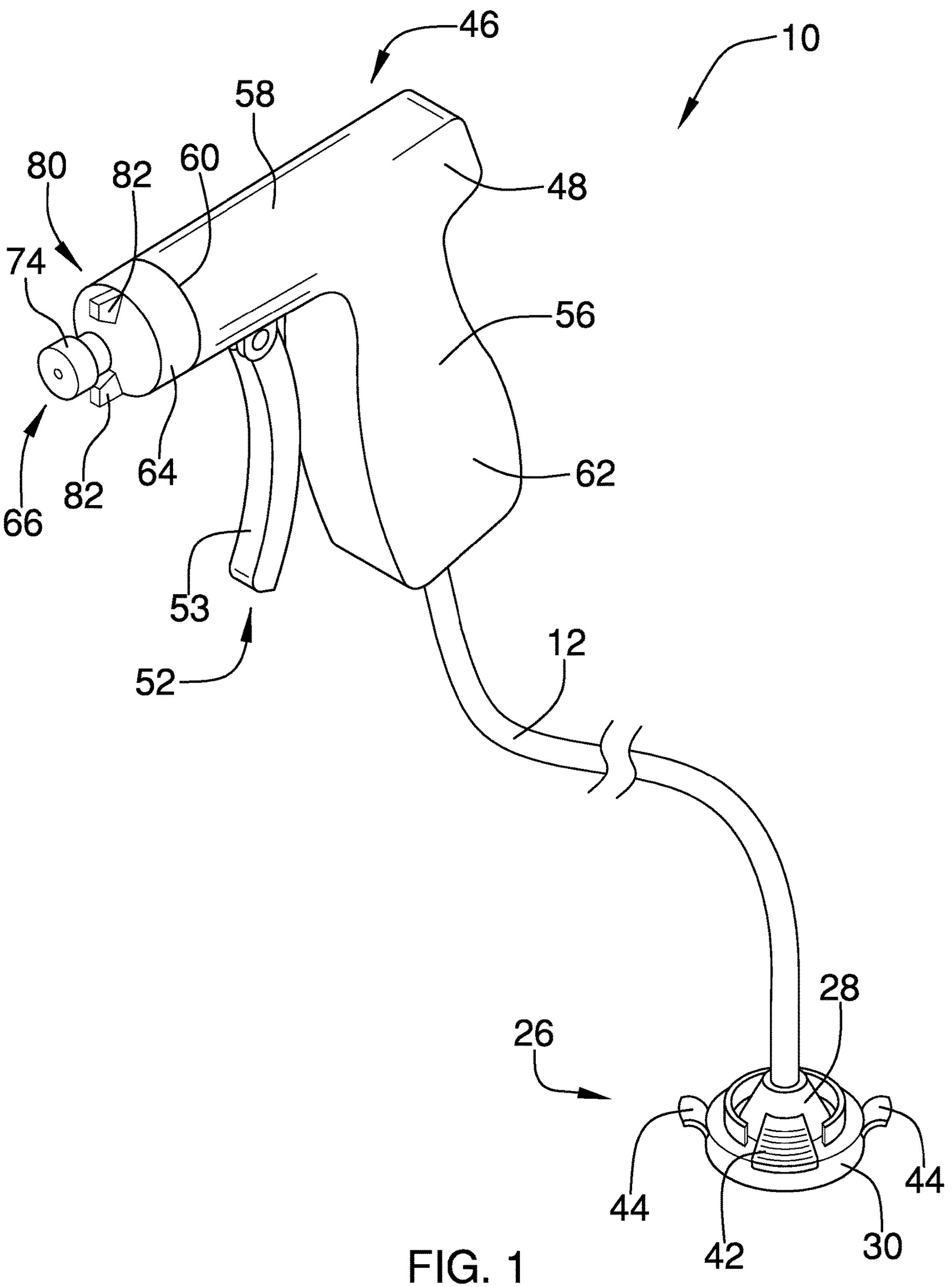
FIG. 1 is a top front side perspective view of a sprayer apparatus according to an embodiment of the disclosure.
Figure 2:
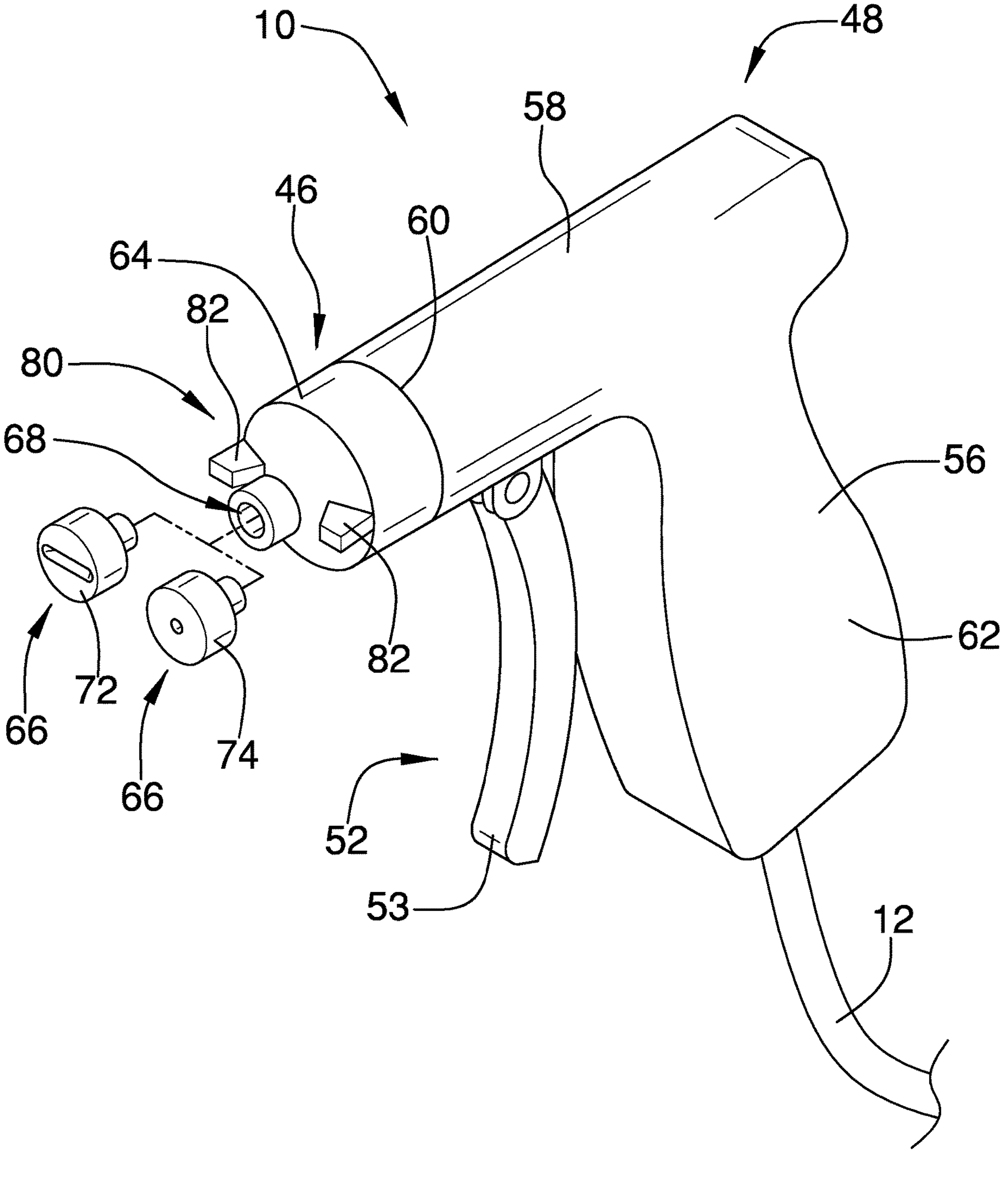
FIG. 2 is an exploded detail view of a dispenser gun of an embodiment of the disclosure.
Figure 3:
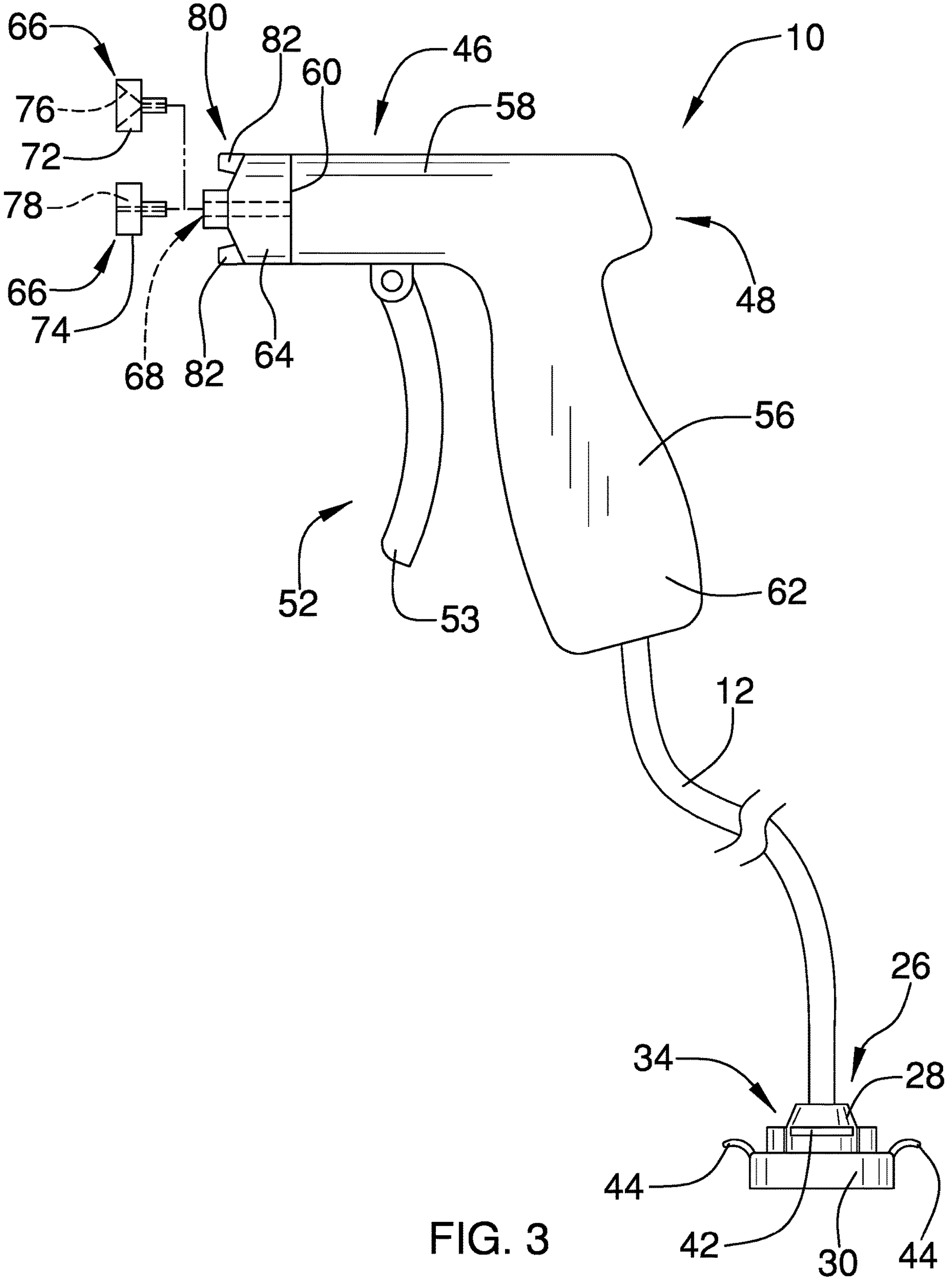
FIG. 3 is a side view of an embodiment of the disclosure.
Figure 4:
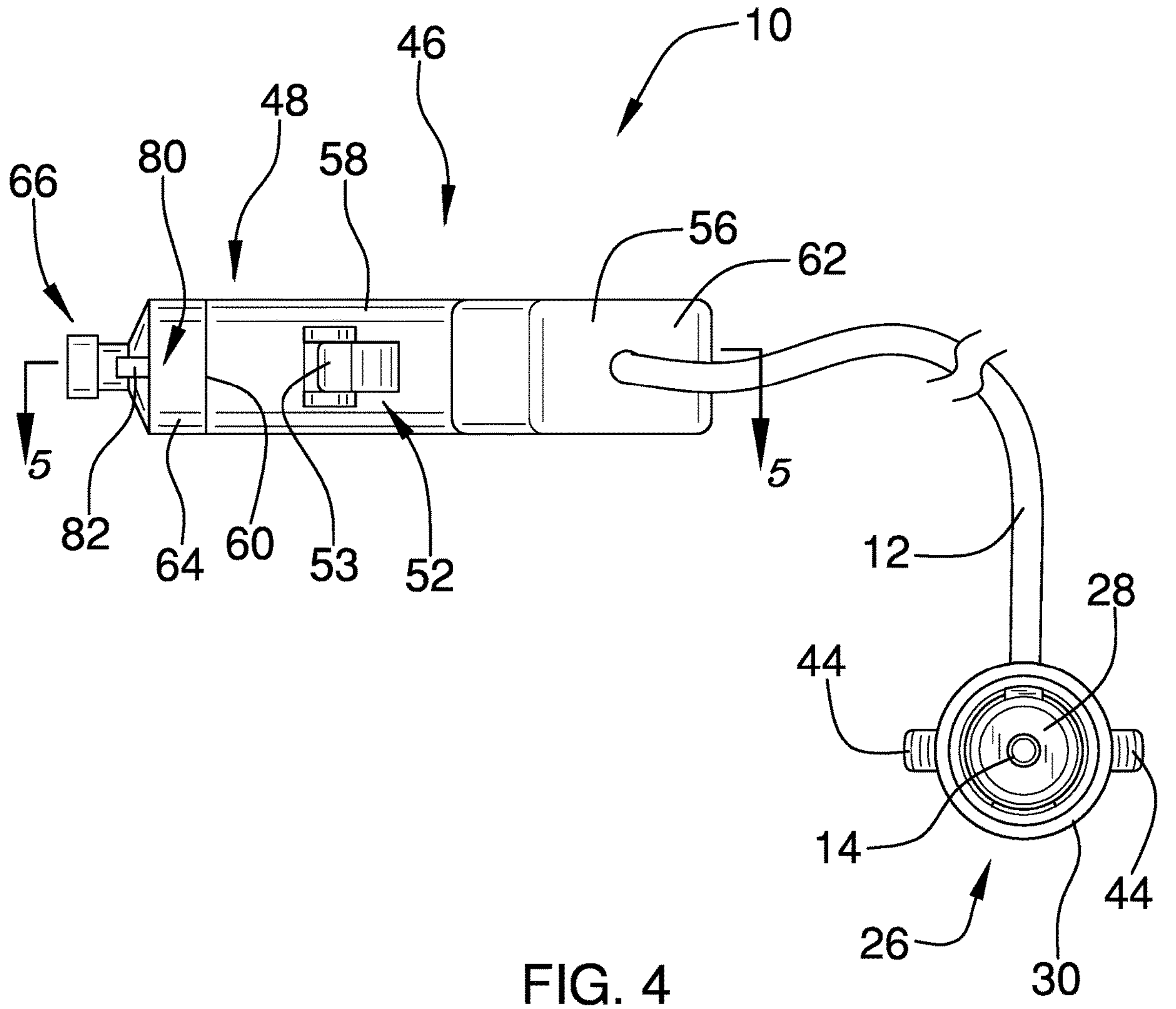
FIG. 4 is a bottom view of an embodiment of the disclosure.
Figure 5:
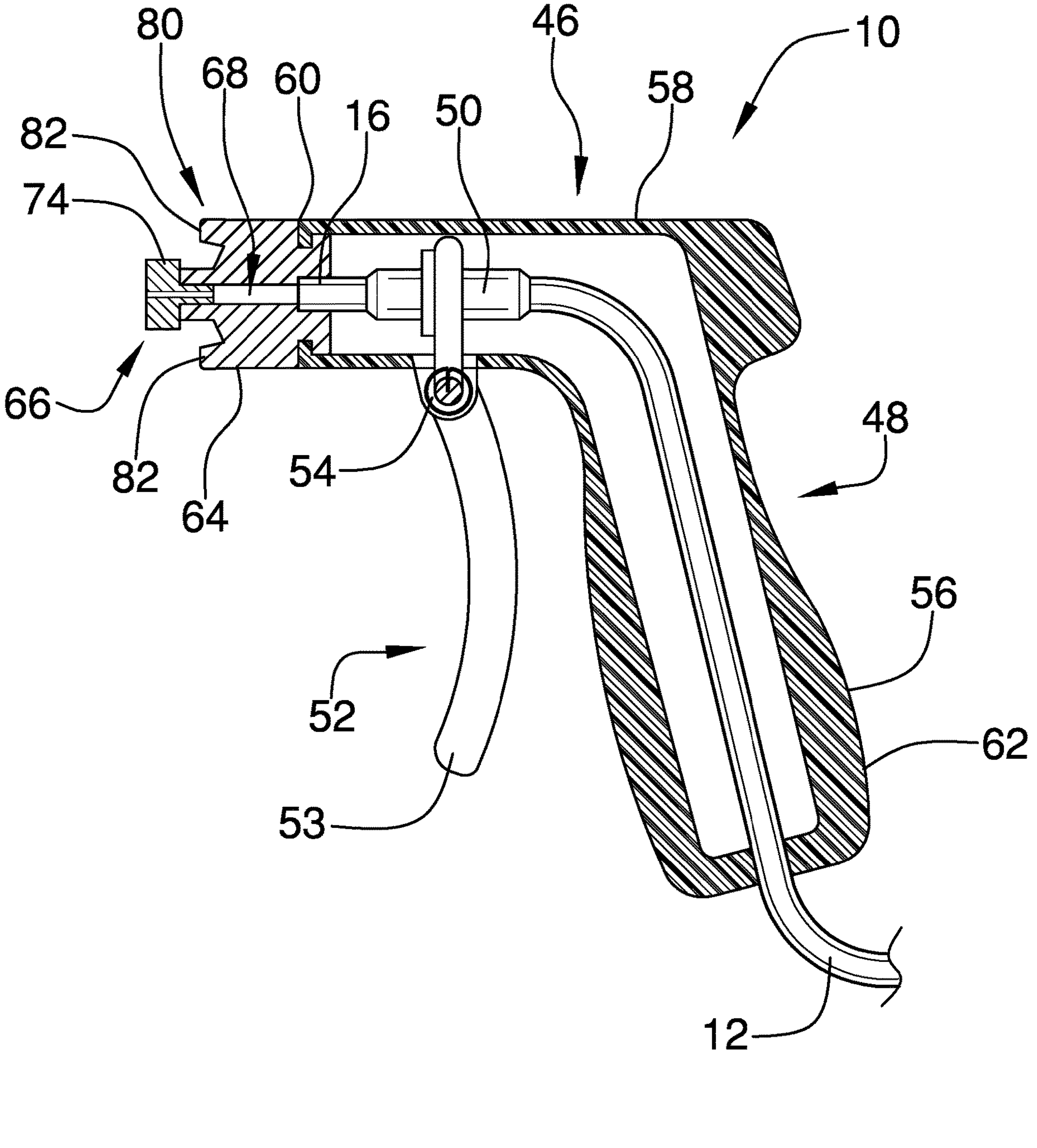
FIG. 5 is a cross-section view of an embodiment of the disclosure taken from Arrows 5-5 in FIG. 4.
Figure 6:
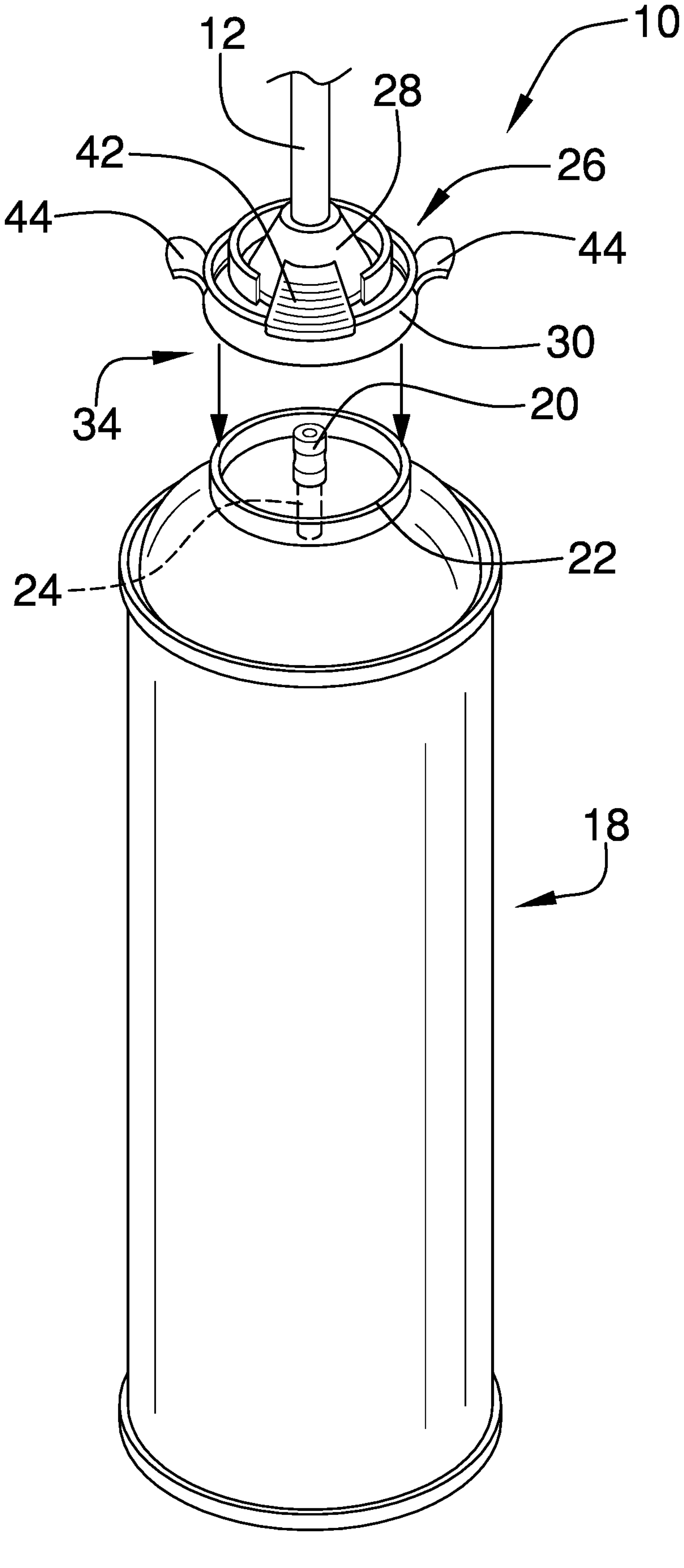
FIG. 6 is an exploded detail view of a spray can valve actuator of an embodiment of the disclosure and an aerosol spray can.
Figure 7:
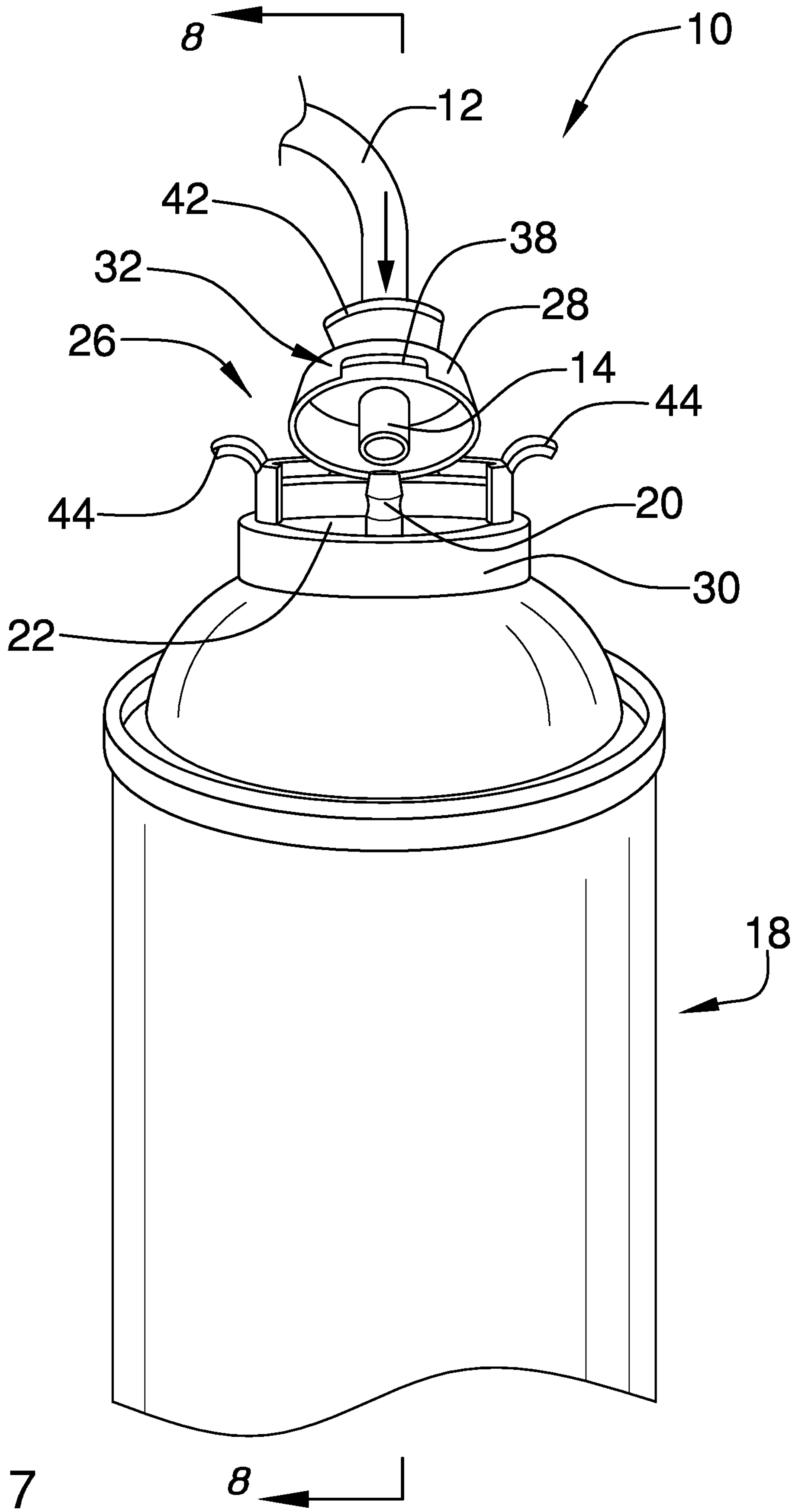
FIG. 7 is a detail view of the spray can valve actuator of an embodiment of the disclosure and the aerosol spray can.
Figure 8:
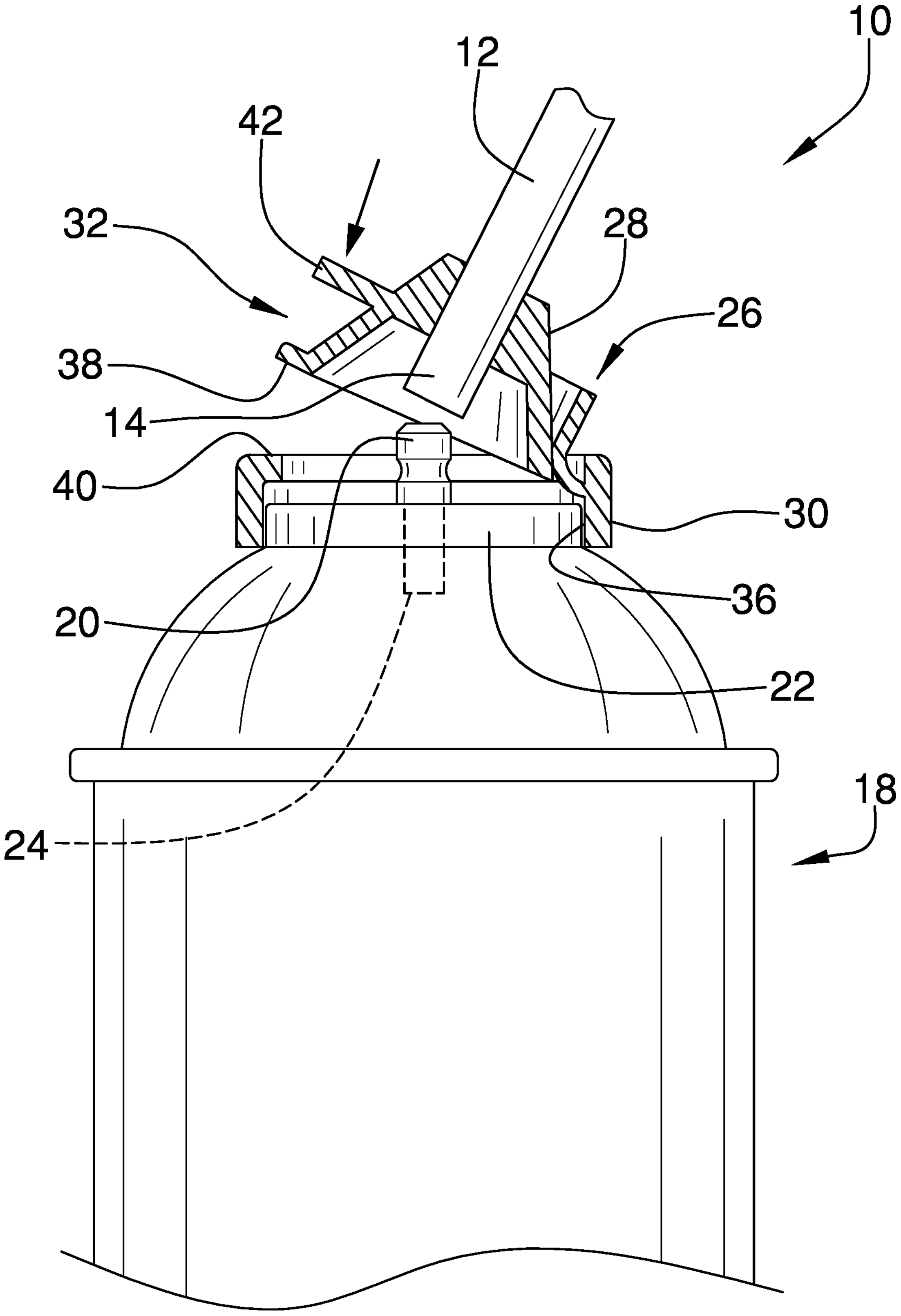
FIG. 8 is a cross-section view of an embodiment of the disclosure taken from Arrows 8-8 in FIG. 7.
Figure 9:
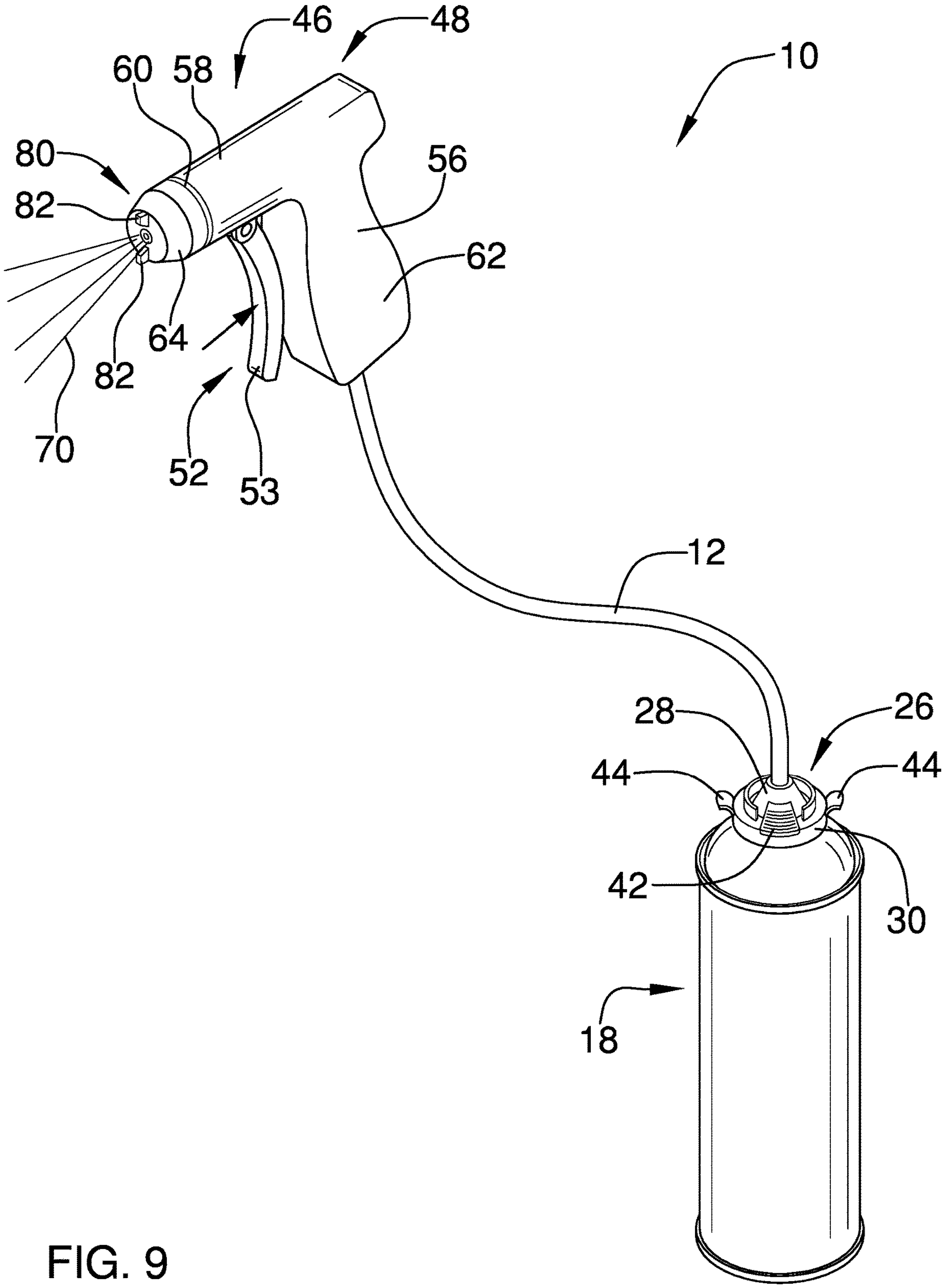
FIG. 9 is an in-use view of an embodiment of the disclosure.
Figure 10:
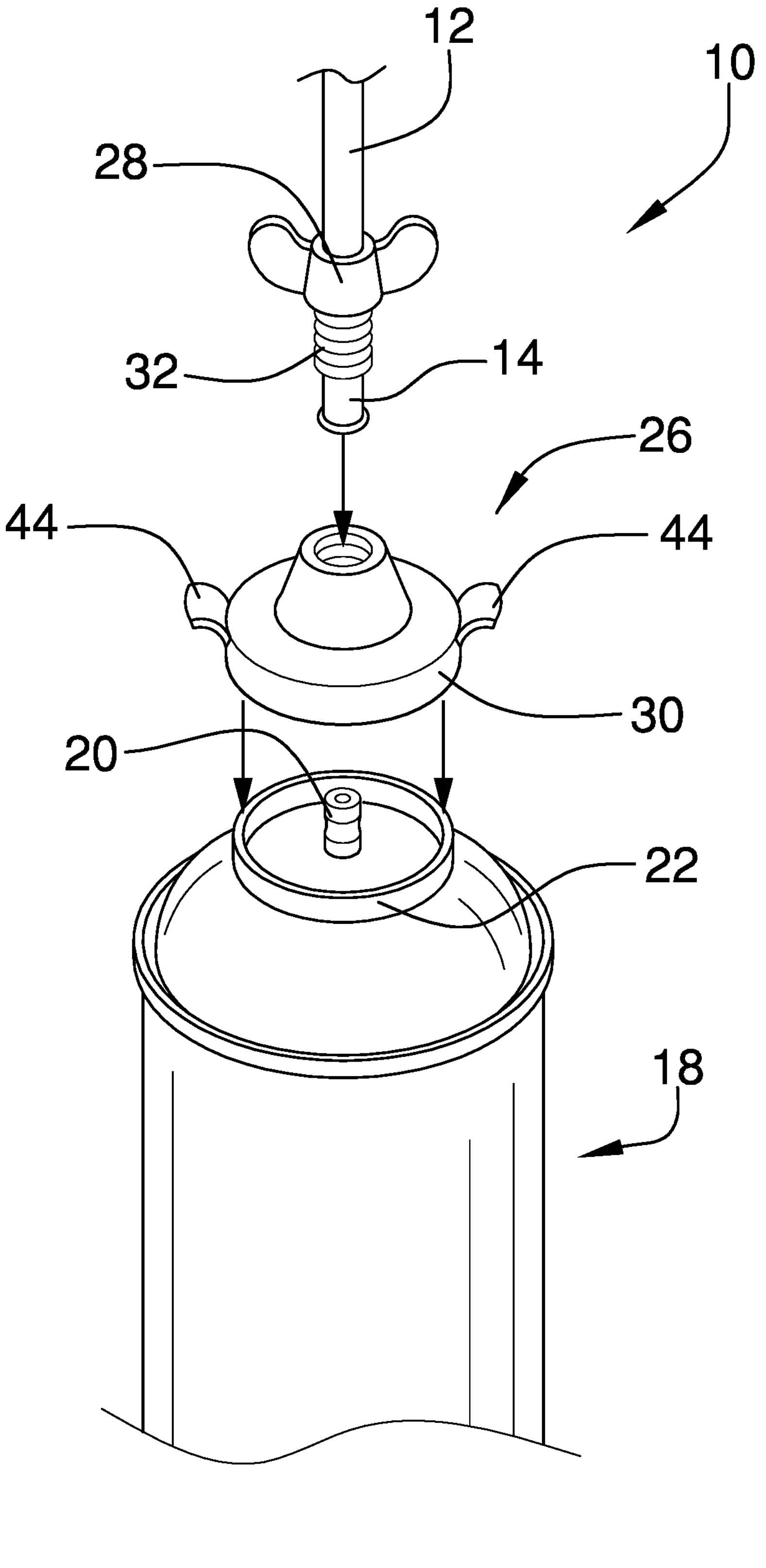
FIG. 10 is a detail view of a spray can valve actuator of an alternative embodiment of the disclosure and the aerosol spray can.

With reference now to the drawings, and in particular to FIGS. 1 through 10 thereof, a new sprayer apparatus embodying the principles and concepts of an embodiment of the disclosure and generally designated by the reference numeral 10 will be described.

As best illustrated in FIGS. 1 through 10, the sprayer apparatus 10 generally comprises a tube 12 with an inlet end 14 and an outlet end 16. An inner dimension of the inlet end 14 has a size such that the inlet end 14 is configured to receive a valve stem 20 of an aerosol spray can 18 into the inlet 14 and frictionally engage the valve stem 20 to attach to the valve stem 20. The tube 12 comprises a flexible material such that the outlet end 16 is movable with respect to the inlet end 14.

A spray can valve actuator 26 is coupled to the tube 12 at the inlet end 14. The spray can valve actuator 26 comprises an attachment member 28, a collar 30, and a retainer 32. The attachment member 28 is coupled to the tube 12 and to the collar 30. The attachment member 28 is positioned in the collar 30. An interior dimension of the collar 30 has a size such that the collar 30 is configured to frictionally engage a rim 22 of the aerosol spray can 18 to attach to the aerosol spray can 18. The attachment member 28 is movable into a lowered position 34 with respect to the collar 30 and is configured to cause the tube 12 to actuate the valve stem 20 to open a spray valve 24 of the aerosol spray can 18 when the attachment member 28 is moved into the lowered position 34 such that a chamber within the aerosol spray can 18 is in fluid communication with the tube 12. The attachment member 28 is pivotally coupled to an inner surface 36 of the collar 30 but may be slidably coupled, threadedly coupled, or the like such that the attachment member 28 can be moved alternately into and out of the lowered position 34.

The retainer 32 is coupled to the attachment member 28 and the collar 30 to retain the attachment member 28 in the lowered position 34. The retainer 32 comprises a first engagement member 38 and a second engagement member 40. The first engagement member 38 is coupled to and extends outwardly from the attachment member 28, and the second engagement member 40 is coupled to and extends inwardly from the collar 30. The first and second engagement member 40*s* have a snap fit connection with each other when the attachment member 28 is positioned in the lowered position 34. In some embodiments, the retainer 32 may have a latch, a threaded fastener, a friction fit, or the like to retain the attachment member 28 in the lowered position 34. In other embodiments, the first and second engagement members 38, 40 of the retainer 32 comprise threads which also facilitate moving the attachment member 28 alternately into and out of the lowered position 34.

The spray can valve actuator 26 also comprises a grip 42 and a pair of removal tabs 44. The grip 42 is coupled to and extends outwardly from the attachment member 28 to facilitate grasping the attachment member 28. The pair of removal tabs 44 is coupled to and extends outwardly from the collar 30 to facilitate grasping the collar 30 to remove the spray can valve actuator 26 from the aerosol spray can 18. The removal tabs 44 extend in opposite directions from each other.

A dispenser gun 46 is coupled to the tube 12 at the outlet end 16. The dispenser gun 46 comprises a housing 48, a dispenser valve 50, a dispenser actuator 52, and a torsion spring 54. The housing 48 is coupled to the tube 12, and the tube 12 extends into the housing 48. The housing 48 has a handle portion 56 and a dispensing portion 58. The tube 12 extends into the handle portion 56, and the outlet end 16 of the tube 12 is positioned at a distal end 60 of the dispensing portion 58 of the housing 48 with respect to the handle portion 56. The handle portion 56 comprises a pistol grip 62. The dispenser valve 50 is positioned in the housing 48 and is in fluid communication with the tube 12. The dispenser valve 50 is movable between an open position and a closed position. The dispenser actuator 52 is operatively coupled to the dispenser valve 50 and extends away from the dispenser valve 50 and out of the housing 48. The dispenser actuator 52 comprises a lever 53 which is pivotable toward the handle portion 56 of the housing 48 to open the dispenser valve 50 and away from the handle portion 56 to close the dispenser valve 50. The dispenser actuator 52 is biased to close the dispenser valve 50. The torsion spring 54 is coupled to the housing 48 and the dispenser actuator 52 to bias the dispenser actuator 52 to close the dispenser valve 50, but the dispenser actuator 52 also may be biased by a compression spring positioned between and engaging the dispenser actuator 52 and the handle, a resiliently bendable material in the dispenser actuator 52, or other conventional means.

The dispenser gun 46 also includes a spray head 64 and a pair of nozzles 66. The spray head 64 is attached to the distal end 60 of the dispensing portion 58 of the housing 48. The spray head 64 has a channel 68 extending therethrough and is in fluid communication with the outlet 16 of the tube 12. Each nozzle 66 of a pair of nozzles 66 is interchangeably couplable to the spray head 64 to fluidly couple to the channel 68. Each nozzle 66 of the pair of nozzles 66 defines a selected nozzle 66 when coupled to the spray head 64, and the selected nozzle 66 is configured for facilitating dispensing a fluid 70 released from the aerosol spray can 18.

The pair of nozzles 66 includes a flat nozzle 72 and a jet nozzle 74. The flat nozzle 72 has an interior shape 76 such that the flat nozzle 72 is configured to dispense the fluid 70 along a plane extending through the flat nozzle 72. The jet nozzle 74 has an interior shape 78 such that the jet nozzle 74 is configured to dispense the fluid 70 along a line extending through the jet nozzle 74. The spray head 64 is rotatable with respect to the housing 48 to cause the selected nozzle 66 to rotate. The spray head 64 is configured to orient a stream of the fluid 70 dispensed through the selected nozzle 66. For example, when the flat nozzle 72 is coupled to the spray head 64, the plane along which the fluid 70 is dispensed is rotated when the spray head 64 is rotated with respect to the housing 48.

An indicator 80 is coupled to the spray head 64 for indicating an orientation of the stream of the fluid 70 dispensed through the selected nozzle 66. The indicator 80 comprises a pair of fins 82 coupled to the spray head 64 and positioned opposite each other across the selected nozzle 66. The fins 82 may be designed to appear visually similar to portions of spray caps of conventional pneumatic spray guns which contain conduits for directing compressed gas into a spray leaving the spray gun to shape the spray. The indicator 80 may comprise indicia which may include a symbol, an alphanumeric character, a graphical image, or the like. The indicator 80 also may comprise a structural member different from the pair of fins 82.

In use, one of the nozzles 66 is attached to the spray head 64. The tube 12 is coupled to the valve stem 20 of the aerosol spray can 18 and the spray can valve actuator 26 is attached to the rim 22 of the aerosol spray can 18. The attachment member 28 is positioned in the lower position to cause the tube 12 to actuate the valve stem 20 to open the spray valve 24 of the aerosol spray can 18 and fluidly couple the chamber of the aerosol spray can 18 with the tube 12. The dispenser actuator 52 is moved to open the dispenser valve 50. A compressed propellent contained in the aerosol spray can 18 urges the fluid 70 contained in the aerosol spray can 18 through the spray valve 24, the tube 12, and the selected nozzle 66. The dispenser actuator 52 is released to close the dispenser valve 50 and prevent the fluid 70 from dispensing out of the selected nozzle 66.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sprayer apparatus for attaching to a valve stem of an aerosol spray can, the sprayer apparatus comprising:
- a tube having an inlet end and an outlet end, an inner dimension of the inlet end having a size such that the inlet end is configured to receive the valve stem into the inlet end and frictionally engage the valve stem to attach to the valve stem;
- a spray can valve actuator being coupled to the tube at the inlet end, the spray can valve actuator comprising:
  - an attachment member being coupled to the tube; and
  - a collar being coupled to the attachment member, the attachment member being positioned in the collar, an interior dimension of the collar having a size such that the collar is configured to frictionally engage a rim of the aerosol spray can to attach to the aerosol spray can, the attachment member being movable into a lowered position with respect to the collar, the attachment member being configured to cause the tube to actuate the valve stem to open a spray valve of the aerosol spray can when the attachment member is moved into the lowered position such that a chamber within the aerosol spray can is in fluid communication with the tube; and
- a dispenser gun being coupled to the tube at the outlet end, the dispenser gun comprising:
  - a housing being coupled to the tube, the tube extending into the housing;
  - a dispenser valve being positioned in the housing and being in fluid communication with the tube, the dispenser valve being movable between an open position and a closed position; and
  - a dispenser actuator being operatively coupled to the dispenser valve and extending away from the dispenser valve and out of the housing.

2. The apparatus of claim 1, wherein the tube comprises a flexible material such that the outlet end is movable with respect to the inlet end.

3. The apparatus of claim 1, wherein the attachment member is pivotally coupled to an inner surface of the collar.

4. The apparatus of claim 1, wherein the spray can valve actuator further comprises a retainer being coupled to the attachment member and the collar to retain the attachment member in the lowered position, the retainer comprising a first engagement member and a second engagement member, the first engagement member being coupled to and extending outwardly from the attachment member, the second engagement member being coupled to and extending inwardly from the collar.

5. The apparatus of claim 4, wherein the first and second engagement members have a snap fit connection with each other when the attachment member is positioned in the lowered position.

6. The apparatus of claim 1, wherein the spray can valve actuator further comprises a grip being coupled to and extending outwardly from the attachment member to facilitate grasping the attachment member.

7. The apparatus of claim 1, wherein the spray can valve actuator further comprises a pair of removal tabs being coupled to and extending outwardly from the collar to facilitate grasping the collar to remove the spray can valve actuator from the aerosol spray can.

8. The apparatus of claim 7, wherein the pair of removal tabs extend in opposite directions from each other.

9. The apparatus of claim 1, wherein the housing of the dispenser gun has a handle portion and a dispensing portion, the tube extending into the handle portion, the outlet end of the tube being positioned at a distal end of the dispensing portion of the housing with respect to the handle portion.

10. The apparatus of claim 9, wherein the handle portion comprises a pistol grip.

11. The apparatus of claim 1, wherein the dispenser actuator of the dispenser gun comprises a lever which is pivotable toward the handle portion of the housing to open the dispenser valve and away from the handle portion to close the dispenser valve.

12. The apparatus of claim 1, wherein the dispenser actuator is biased to close the dispenser valve.

13. The apparatus of claim 12, wherein the dispenser gun further comprises a torsion spring being coupled to the housing and the dispenser actuator to bias the dispenser actuator to close the dispenser valve.

14. The apparatus of claim 1, wherein the dispenser gun further comprises a spray head being attached to the distal end of the dispensing portion of the housing with respect to the handle portion, the spray head having a channel extending therethrough and being in fluid communication with the outlet of the tube.

15. The apparatus of claim 14, further comprising a pair of nozzles, each nozzle of the pair of nozzles being interchangeably couplable to the spray head to fluidly couple to the channel, said each nozzle of the pair of nozzles defining a selected nozzle when coupled to the spray head, the selected nozzle being configured for facilitating dispensing a fluid released from the aerosol spray can.

16. The apparatus of claim 15, wherein the pair of nozzles includes:
- a flat nozzle having an interior shape such that the flat nozzle is configured to dispense the fluid along a plane extending through the flat nozzle; and
- a jet nozzle having an interior shape such that the jet nozzle is configured to dispense the fluid along a line extending through the jet nozzle.

17. The apparatus of claim 15, wherein the spray head is rotatable with respect to the housing to cause the selected nozzle to rotate, the spray head being configured to orient a spray pattern of the fluid dispensed through the selected nozzle.

18. The apparatus of claim 17, further comprising an indicator being coupled to the spray head for indicating an orientation of a stream of the fluid dispensed through the selected nozzle.

19. The apparatus of claim 18, wherein the indicator comprises a pair of fins coupled to the spray head and positioned opposite each other across the selected nozzle.

20. A sprayer apparatus for attaching to a valve stem of an aerosol spray can, the sprayer apparatus comprising:

a tube having an inlet end and an outlet end, an inner dimension of the inlet end having a size such that the inlet end is configured to receive the valve stem into the inlet end and frictionally engage the valve stem to attach to the valve stem, the tube comprising a flexible material such that the outlet end is movable with respect to the inlet end;

a spray can valve actuator being coupled to the tube at the inlet end, the spray can valve actuator comprising:

an attachment member being coupled to the tube;

a collar being coupled to the attachment member, the attachment member being positioned in the collar, an interior dimension of the collar having a size such that the collar is configured to frictionally engage a rim of the aerosol spray can to attach to the aerosol spray can, the attachment member being movable into a lowered position with respect to the collar, the attachment member being configured to cause the tube to actuate the valve stem to open a spray valve of the aerosol spray can when the attachment member is moved into the lowered position such that a chamber within the aerosol spray can is in fluid communication with the tube, the attachment member being pivotally coupled to an inner surface of the collar;

a retainer being coupled to the attachment member and the collar to retain the attachment member in the lowered position, the retainer comprising a first engagement member and a second engagement member, the first engagement member being coupled to and extending outwardly from the attachment member, the second engagement member being coupled to and extending inwardly from the collar, the first and second engagement members having a snap fit connection with each other when the attachment member is positioned in the lowered position;

a grip being coupled to and extending outwardly from the attachment member to facilitate grasping the attachment member; and a pair of removal tabs being coupled to and extending outwardly from the collar to facilitate grasping the collar to remove the spray can valve actuator from the aerosol spray can, the pair of removal tabs extending in opposite directions from each other;

a dispenser gun being coupled to the tube at the outlet end, the dispenser gun comprising:

a housing being coupled to the tube, the tube extending into the housing, the housing having a handle portion and a dispensing portion, the tube extending into the handle portion, the outlet end of the tube being positioned at a distal end of the dispensing portion of the housing with respect to the handle portion, the handle portion comprising a pistol grip;

a dispenser valve being positioned in the housing and being in fluid communication with the tube, the dispenser valve being movable between an open position and a closed position;

a dispenser actuator being operatively coupled to the dispenser valve and extending away from the dispenser valve and out of the housing, the dispenser actuator comprising a lever which is pivotable toward the handle portion of the housing to open the dispenser valve and away from the handle portion to close the dispenser valve, the dispenser actuator being biased to close the dispenser valve;

a torsion spring being coupled to the housing and the dispenser actuator to bias the dispenser actuator to close the dispenser valve; and a spray head being attached to the distal end of the dispensing portion of the housing, the spray head having a channel extending therethrough and being in fluid communication with the outlet of the tube;

a pair of nozzles, each nozzle of the pair of nozzles being interchangeably couplable to the spray head to fluidly couple to the channel, each nozzle of the pair of nozzles defining a selected nozzle when coupled to the spray head, the selected nozzle being configured for facilitating dispensing a fluid released from the aerosol spray can, the pair of nozzles including:

a flat nozzle having an interior shape such that the flat nozzle is configured to dispense the fluid along a plane extending through the flat nozzle; and a jet nozzle having an interior shape such that the jet nozzle is configured to dispense the fluid along a line extending through the jet nozzle; and wherein the spray head is rotatable with respect to the housing to cause the selected nozzle to rotate, the spray head being configured to orient a spray pattern of the fluid dispensed through the selected nozzle; and an indicator being coupled to the spray head for indicating an orientation of a stream of the fluid dispensed through the selected nozzle, the indicator comprising a pair of fins coupled to the spray head and positioned opposite each other across the selected nozzle.

* * * * *